(12) United States Patent
Kunimaru et al.

(10) Patent No.: US 7,881,312 B2
(45) Date of Patent: Feb. 1, 2011

(54) DSL TERMINAL-EXCHANGE DEVICE CONNECTING SYSTEM AND METHOD

(75) Inventors: Hiroyuki Kunimaru, Tokyo (JP); Kazuya Yanagi, Tokyo (JP)

(73) Assignee: Juniper Networks, Inc., Sunnyvale, CA (US)

( * ) Notice: Subject to any disclaimer, the term of this patent is extended or adjusted under 35 U.S.C. 154(b) by 1321 days.

(21) Appl. No.: 11/379,706

(22) Filed: Apr. 21, 2006

(65) Prior Publication Data

US 2006/0187938 A1 Aug. 24, 2006

Related U.S. Application Data

(63) Continuation of application No. 10/066,666, filed on Feb. 6, 2002, now Pat. No. 7,085,278.

(30) Foreign Application Priority Data

Jun. 2, 2001 (JP) ............................... 2001-29601

(51) Int. Cl.
*H04L 12/28* (2006.01)
(52) U.S. Cl. .................. 370/401; 370/535; 370/352; 370/356; 370/395.64
(58) Field of Classification Search .................. None
See application file for complete search history.

(56) References Cited

U.S. PATENT DOCUMENTS

| | | | |
|---|---|---|---|
| 6,512,762 B1 * | 1/2003 | Renucci et al. | 370/352 |
| 6,546,089 B1 * | 4/2003 | Chea et al. | 379/93.06 |
| 6,580,225 B2 | 6/2003 | Czajkowski et al. | 370/356 |
| 6,771,763 B1 * | 8/2004 | Hagirahim et al. | 379/219 |
| 7,085,278 B2 * | 8/2006 | Kunimaru et al. | 370/395.61 |
| 7,330,460 B1 * | 2/2008 | Hagirahim et al. | 370/352 |
| 2004/0125936 A1 | 7/2004 | Flynn et al. | 379/229 |

FOREIGN PATENT DOCUMENTS

| | | |
|---|---|---|
| EP | 1 113 696 | 7/2001 |
| JP | 11-261650 | 9/1999 |
| JP | 11-331191 | 11/1999 |
| JP | 2000-004242 | 1/2000 |
| JP | 2001-237900 | 8/2001 |
| WO | WO 01/26312 | 4/2001 |

\* cited by examiner

*Primary Examiner*—Duc C Ho
(74) *Attorney, Agent, or Firm*—Harrity & Harrity, LLP

(57) ABSTRACT

A network device includes a media gateway to receive and process a voice over digital subscriber line (VoDSL) communication to generate voice data in a predetermined format; a terminating unit to receive another type of voice communication and output voice data in the predetermined format; and a control unit to receive the generated voice data from the media gateway and the outputted voice data from the terminating unit, where the network device exchanges at least one of the VoDSL communication to the other type of voice communication or the other type of voice communication to the VoDSL communication.

14 Claims, 4 Drawing Sheets

DSL TERMINAL-EXCHANGE DEVICE CONNECTING SYSTEM AND METHOD

BACKGROUND OF THE INVENTION

1. Field of the Invention

The present invention relates to a DSL terminal—An exchange device connecting system and method and, more particularly to, such the DSL terminal—the exchange device connecting system and method that uses a VoDSL technology to transfer voice data in a packet through a DSL.

2. Description of the Related Art

A communication technology for creating an ATM cell by using a subscriber access device is disclosed in Japanese Patent Application Laid-Open No. Hei 11-331191. The VoDSL (Voice over DSL) technology can be used in a voice communication service. In a voice communication service by use of VoDSL, a subscriber using the VoDSL technology is accommodated in a exchange device 101 by, as shown in FIG. 4, terminating voice data transmitted in an ATM cell through an xDSL 102 with a VoDSLGW (gateway) 103 and utilizing an access network such as a V5 or GR-303 interface 104. To apply the voice communication service by use of the VoDSL technology to the existing exchange device 101, it is necessary to prepare a switching device for connecting such an access network 104 into the exchange device 101. The connection of the line and the installation of such a switching device will result in the corresponding costs being imposed on an end user.

However, it is desired to avoid increasing such costs.

SUMMARY OF THE INVENTION

It is an object of the present invention to provide such a DSL terminal exchange device connecting system and method that will not increase the costs on a user.

Means for solving this problem is expressed as follows. Technological items given in this expression are assigned a subscript of a numeral, a symbol, etc. parenthesized. These numeral, symbol, etc. agree with those added to technological items which constitute at least one or a plurality of embodiments or examples of the present invention, in particular such technological items that are given in drawings which correspond to these embodiments or examples. Those reference numerals and symbols are given to clearly define the correspondence or correlation between the technological items described in the claims and those described in the embodiments or examples. Such correspondence or correlation does not mean that the technological items described in the claims are limited to those described in the embodiments or examples.

A DSL terminal—An Exchange device connecting system according to present invention comprising: the exchange device 3; a DSL subscriber terminal 2-*n*; an IAD 1 to which said DSL subscriber terminal 2-*n* is connected; and a DSL 5 interposed between said exchange device 3 and said IAD 1, wherein said exchange device 3 having a VMG 4 for terminating an ATM cell which is multiplexed on said DSL 5.

Call processing can be controlled without knowing about a device under the control of a subscriber control unit by the exchange device software that can terminate a voice packet transmitted as multiplexed over a DSL (5) by using the exchange device (3), which then converts the voice packet into a packet according to an existing exchange device interface to thereby directly accommodate a DSL subscriber therein.

Since voice data over the xDSL utilizing the VoDSL technology is thus converted into data according to the existing exchange device interface data directly, the DSL subscriber appears to the exchange device to be equivalent to an existing voice communication service subscriber and so can be accommodated in an existing exchange device. It is, therefore, possible to increase the number of subscribers who can be accommodated in the exchange device only by providing the exchange device with a VMG (Voice Media Gateway) just like a subscriber accommodating device, thus decreasing the equipment funds for accommodation of the subscribers. By replacing an existing subscriber accommodating device with a VMG in a remote station installed in a remote area also, it is possible to increase the number of subscribers accommodated by that remote station.

The VMG(4) can be equipped with a DSL·IF terminating unit (7) for directly terminating an ATM cell to thereby terminate the ATM cell at the exchange device. The VMG(4) further including an AAL processing unit (9) for dividing the ATM cells terminated at the DSL·IF terminating unit (7) to a voice signal cell (11) and a call control signal cell (12), a DSP (13) for converting an ADPCM data for the voice signal cell (11), and a MUX/DMUX (14) for multiplexing the voice signal cell converted by the DSP(13) and the call control signal cell (17). Thus added DSP is adapted to convert voice data from, for example, 32KADPCM to 64KADPCM in modulation data. A DSLAM (Digital Subscriber Line Access Multiplexer) (21) can be terminated at a DSL (5) to thereby convert voice on the DSL (5) into an ATM cell. The DSLAM (21) can be directly connected to the AAL (9) through an ATM network (22), in which case the DSL IF terminating unit (7) is omitted.

A method of present invention for connecting the exchange device for a DSL terminal comprises the steps of terminating at the exchange device (3) a voice packet transmitted as multiplexed over the DSL (5) and permitting the switchboard (3) to convert the voice packet into a packet according to an existing switchboard interface (8), thus enabling directly accommodating a subscriber in the exchange device.

DESCRIPTION OF THE PREFERRED EMBODIMENTS

Figure 1:
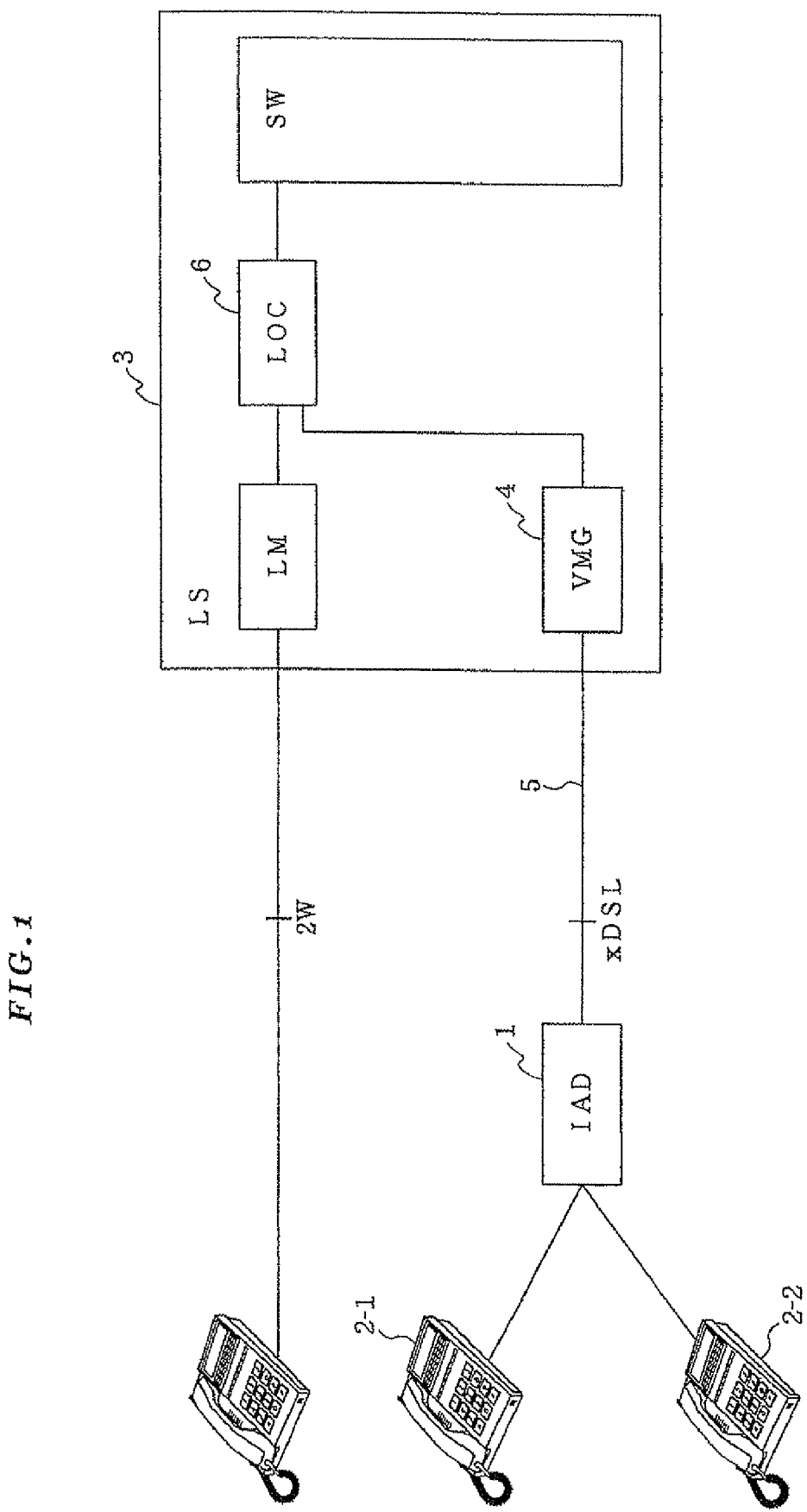
FIG. 1 is system block diagram for showing a DSL terminal-exchange device connecting system according to an embodiment of the present invention.

A DSL terminal—An exchange device connecting system according to an embodiment of the present invention comprises a exchange device as well as an IAD (Integrated Access Device) as shown in the figures. As shown in FIG. 1, this IAD 1 is connected with subscriber terminals 2-1 through 2-*n* (n=1 and 2 in the figure) to thereby accommodate them. The exchange device 3 of the system has a VMG 4 therein. The IAD 1 is connected to the VMG 4 through an xDSL 5.

The VMG 4 terminates the xDSL 5 for transferring voice data of each of a plurality of telephone subscribers accommodated in the IAD 1. The voice data thus transferred is converted into an ATM cell and then transferred through the xDSL 5 to the VMG 4 in the IAD 1.

Figure 2:
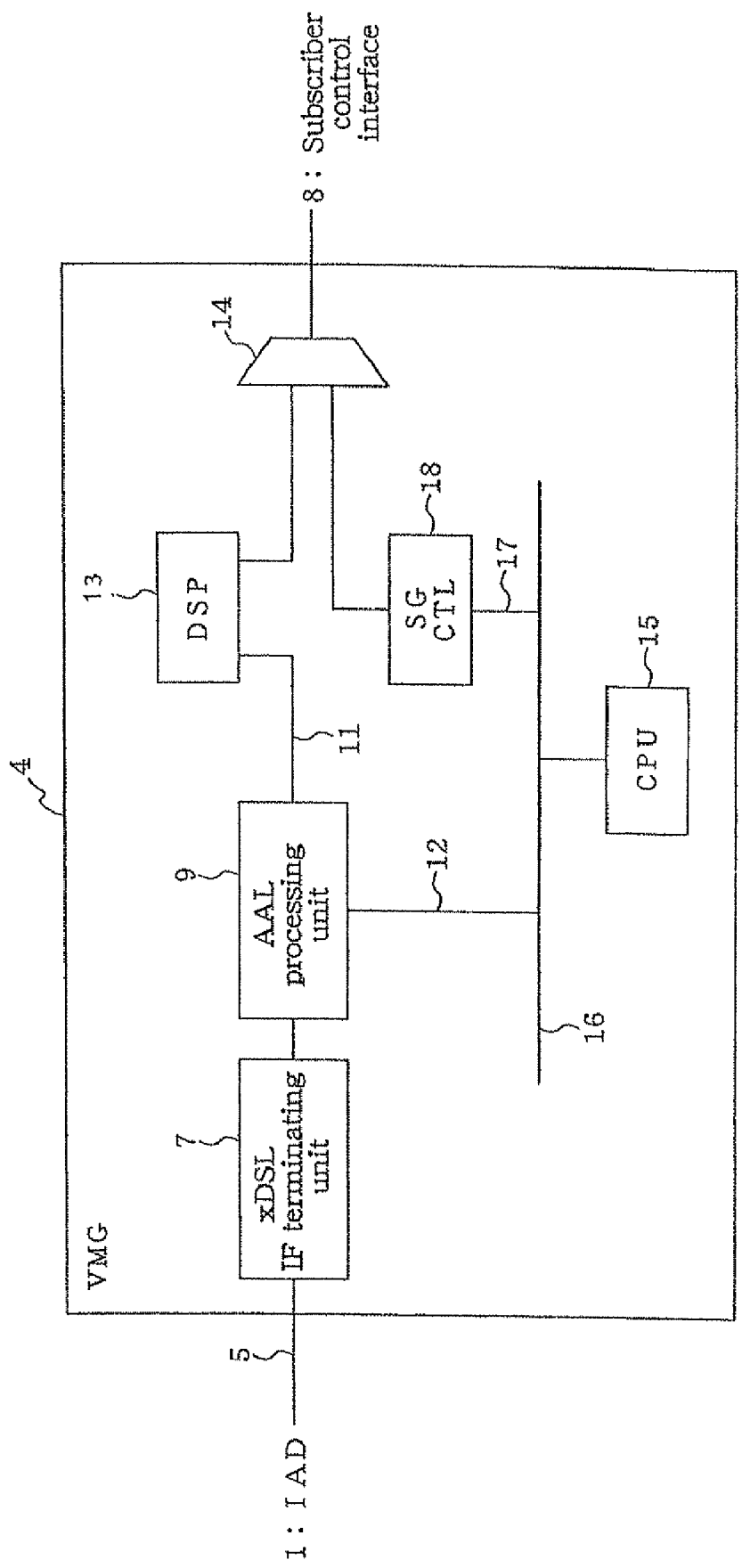
FIG. 2 is a circuit block diagram for showing details of part of FIG. 1.

FIG. 2 shows a detailed internal configuration of the VMG 4. As shown in FIG. 2, the VMG 4 has an xDSL·IF terminating unit 7 therein. The VMG 4 uses the xDSL·IF terminating unit 7 to terminate the xDSL 5 in order to extract voice data from the ATM cell transferred over the xDSL 5 and multiplex it at a subscriber control device interface 8 accompanying the VMG 4. Thus multiplexed voice data is transferred to a subscriber control unit (LOC) 6.

An ATM component received and extracted at the xDSL·IF terminating unit 7 is transferred to an AAL processing unit 9. This ATM component undergoes SAR processing at the AAL processing unit, from which a voice signal cell 11 and a call control signal 12 are divided. The voice signal cell 11 may sometimes be compressed with such a compressing technology as a 32K ADPCM data so that the voice data may enhance an accommodating efficiency of the xDSL 5 thereon.

The voice signal cell 11, if compressed in such a manner, divided at the AAL processing unit 9 to then be transferred to a DSP13. The voice signal cell 11 is converted at the DSP 13 from 32K ADPCM to 64K ADPCM in modulation data and transferred to a MUX/DMUX 14.

The call control signal 12 that otherwise divided at the AAL processing unit 9 is output from there to be read out by a CPU 15. The AAL processing unit 9 is connected to the CPU 15 through a CPU bus 16. The CPU 15 analyzes call control information of the call control signal 12 and interprets it into exchange device control data 17. The exchange device control data 17 is written through the CPU bus 16 into an SG·CTL 18.

The SG·CTL 18 converts the exchange device control data 17 into data of a subscriber control interface format and then transfers it to the MUX/DMUX 14. The MUX/DMUX 14 in turn transfers thus multiplexed voice signal 11 and the call control signal 12 to the subscriber control unit 6 through the subscriber control device interface 8. The voice data at the subscriber control unit 6 is transferred back to the IAD 1 by performing reverse transferring as against the above-mentioned transferring and inverted multiplexing as against the above-mentioned multiplexing.

Figure 3:
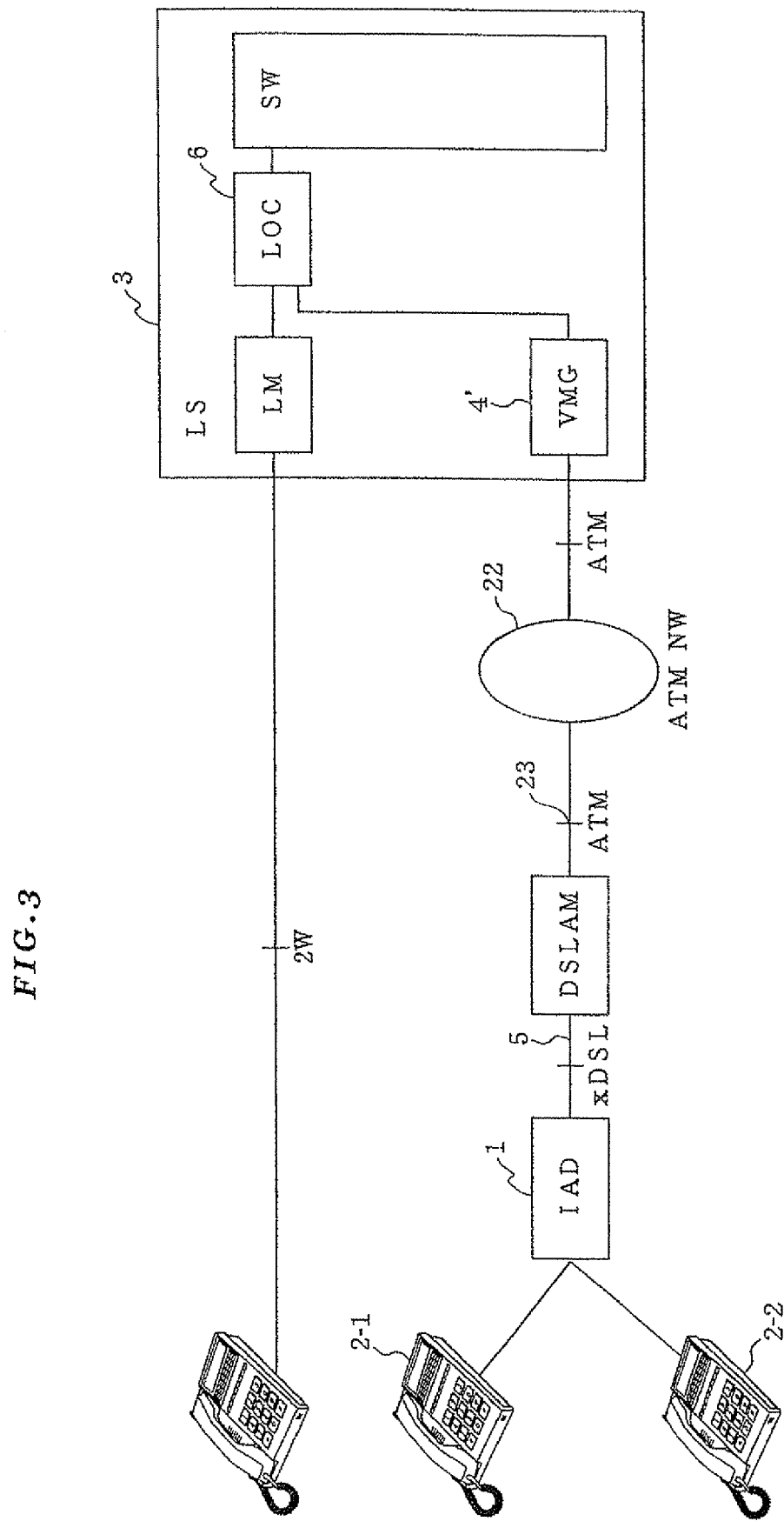
FIG. 3 is a system block diagram for showing the DSL terminal-exchange device switchboard connecting system according to another embodiment of the present invention.
Figure 4:
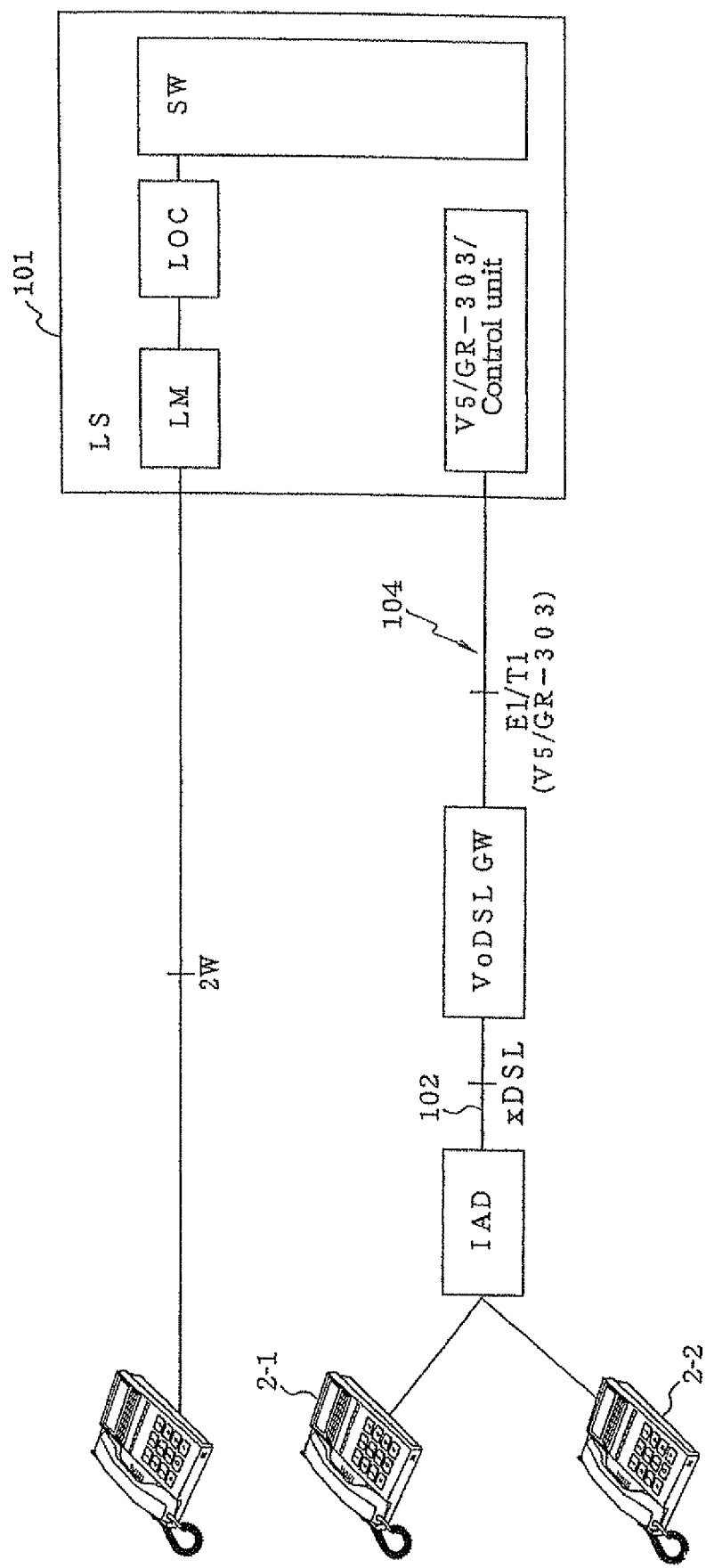
FIG. 4 is a system block diagram for showing a publicly known VoDSL communication system.

FIG. 3 shows an other embodiment of exchange device connecting system of DSL terminal according to present invention. As shown in FIG. 3, this embodiment of the present invention utilizes an ATM network. This ATM network 22 is connected using lines between the IAD 1 and a VMG 4' in the exchange device 3. Between the ATM network 22 and the IAD 1, a DSLAM 21 is provided to the xDSL 5. The xDSL 5 is terminated at the DSLAM 21 to be then converted into an ATM interface 23. The xDSL·IF terminating unit 7 of FIG. 2 is omitted in the VMG 4' in the exchange device 3 according to this embodiment. The ATM interface 23 is terminated at the AAL processing unit 9 of the VMG 4 of FIG. 2, in which the xDSL·IF terminating unit 7 is omitted.

Thus, the DSL terminal-exchange device connecting system and method of the present invention employs a direct accommodating method, thus enabling mitigating the user burdens.

The invention may be embodied in other specific forms without departing from the spirit or essential characteristic thereof. The present embodiments are therefore to be considered in all respects as illustrative and not restrictive, the scope of the invention being indicated by the appended Claims rather than by the foregoing description and all changes which come within the meaning and range of equivalency of the Claims are therefore intended to be embraced therein.

The entire disclosure of Japanese Patent Application No. 2001-29601 (Filed on Feb. 6, 2001) including specification, claims, drawings and summary are incorporated herein by reference in its entirety.

What is claimed is:

1. A network device comprising:
   a media gateway to receive a voice over digital subscriber line (VoDSL) communication, the media gateway comprising:
      a first processing unit to process the VoDSL communication to form a voice signal and a control signal;
      a second processing unit to convert the control signal into network device control data;
      a signaling gateway controller to convert the network device control data into data in a control interface format;
      a digital signal processor to convert the voice signal into voice packets in a predetermined format; and
      a multiplexer to multiplex the voice packets and the data in the control interface format to form voice data;
   a terminating unit to receive another type of voice communication and output voice data in the predetermined format; and
   a control unit to receive the voice data from the media gateway and the outputted voice data from the terminating unit, where the network device exchanges at least one of the VoDSL communication to the other type of voice communication or the other type of voice communication to the VoDSL communication.

2. The network device of claim 1, where the media gateway further comprises:
   an interface terminating unit to directly terminate the VoDSL communication.

3. The network device of claim 1, where the digital signal processor is to convert the voice signal from a 32 k to a 64 k adaptive differential pulse code modulation.

4. The network device of claim 1, further comprising:
   an interface via which the control unit is to receive the multiplexed voice data.

5. A network device comprising:
   a media gateway to receive a voice over digital subscriber line (VoDSL) communication, the media gateway comprising:
      a processing unit to separate the VoDSL communication into a voice signal and a control signal,
      a digital signal processor to convert the voice signal into voice packets in a predetermined format, and
      a multiplexer to multiples the voice packets and the control signal to form voice data;
   a terminating unit to receive another type of voice communication and output voice data in the predetermined format; and
   a control unit to receive the voice data from the media gateway and the outputted voice data from the terminating unit, where the network device exchanges at least one of the VoDSL communication to the other type of voice communication or the other type of voice communication to the VoDSL communication.

6. The network device of claim 5, where the digital signal processor is to convert the voice signal from a 32 k to a 64 k adaptive differential pulse code modulation.

7. The network device of claim 5, further comprising:
   an interface via which the control unit is to receive the multiplexed voice packets and the multiplexed control signal.

8. The network device of claim 5, where the media gateway further comprises:

an interface terminating unit to directly terminate the VoDSL communication.

9. A system comprising:
one or more devices to:
terminate multiplexed voice data received via a digital subscriber line;
divide the terminated multiplexed voice data into a voice signal and a control signal;
convert the control signal into network device control data;
convert the network device control data into data in a control interface format;
convert the voice signal into voice packets; and
multiplex the voice packets and the data in the control interface format.

10. A method comprising:
transferring, from a control unit to a voice media gateway via a control interface, first voice data including voice packets and data in a control interface format, where the first voice data is of a type other than voice over digital subscriber line (VoDSL);
demultiplexing the voice packets and the data in the control interface format;
converting, by a digital signal processor, the voice packets into a voice signal;
converting, by a controller, the data in the control interface format into network device control data;
converting, by a first processing unit, the network device control data into a call control signal; and
processing, by a second processing unit, the call control signal and the voice signal into second voice data; and
transmitting second voice data via a digital subscriber line.

11. The method of claim 10, where the digital signal processor is to convert the voice signal from 64 k to 32 k adaptive differential pulse code modulated data.

12. The method of claim 10, where the voice media gateway comprises the digital signal processor, the controller, the first processing unit, and the second processing unit.

13. The method of claim 12, where the control unit and the voice media gateway reside in an exchange device.

14. A method comprising:
terminating, at a network device, multiplexed voice data received via a digital subscriber line;
dividing, by one or more devices of the network device, the terminated multiplexed voice data into a voice signal and a control signal;
converting, by one or more devices of the network device, the control signal into network device control data;
converting, by one or more devices of the network device, the network device control data into data in a control interface format;
converting, by one or more devices of the network device, the voice signal into voice packets; and
multiplexing, by one or more devices of the network device, the voice packets and the data in the control interface format.

* * * * *